Figure 1:
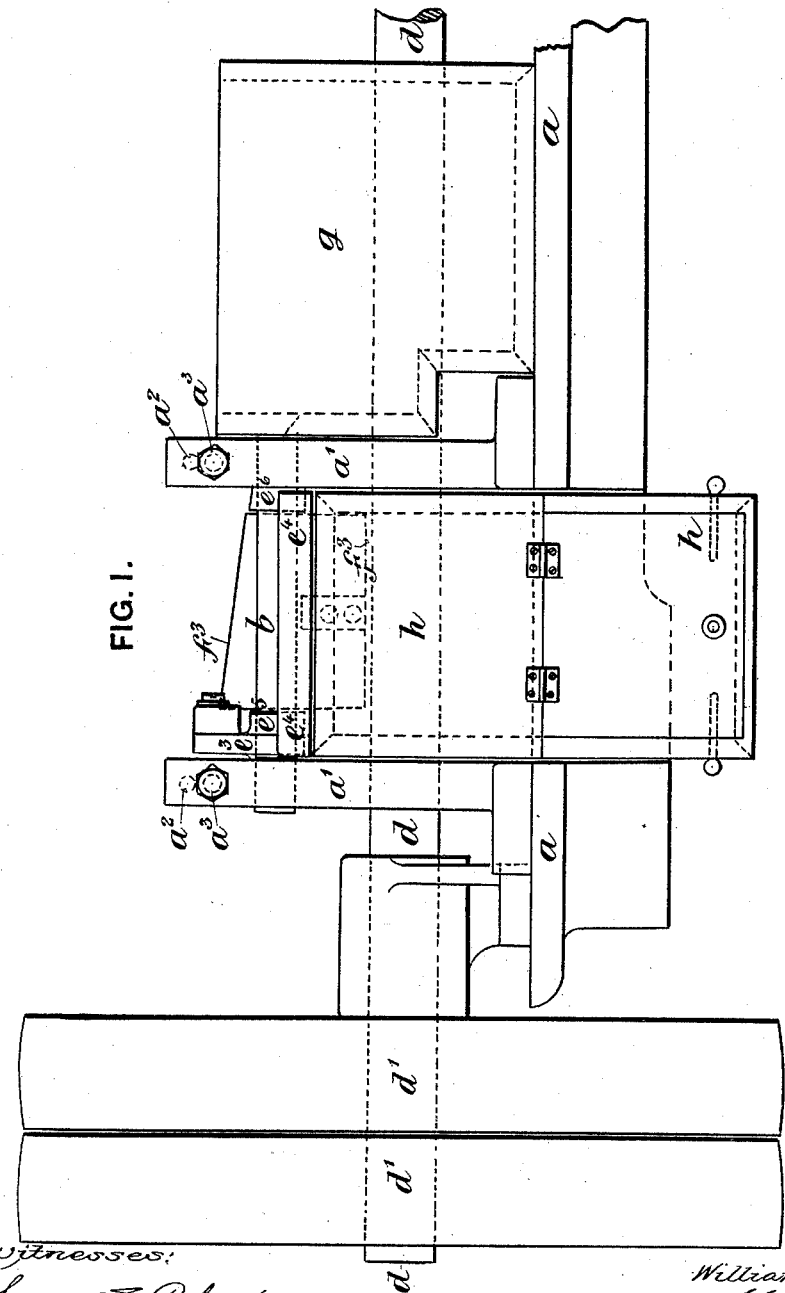

(No Model.) 3 Sheets—Sheet 1.

W. HILLMAN.
MEANS OR APPARATUS FOR GAGING AND SORTING SPHERICAL ROLLERS OR BALLS.

No. 482,636. Patented Sept. 13, 1892.

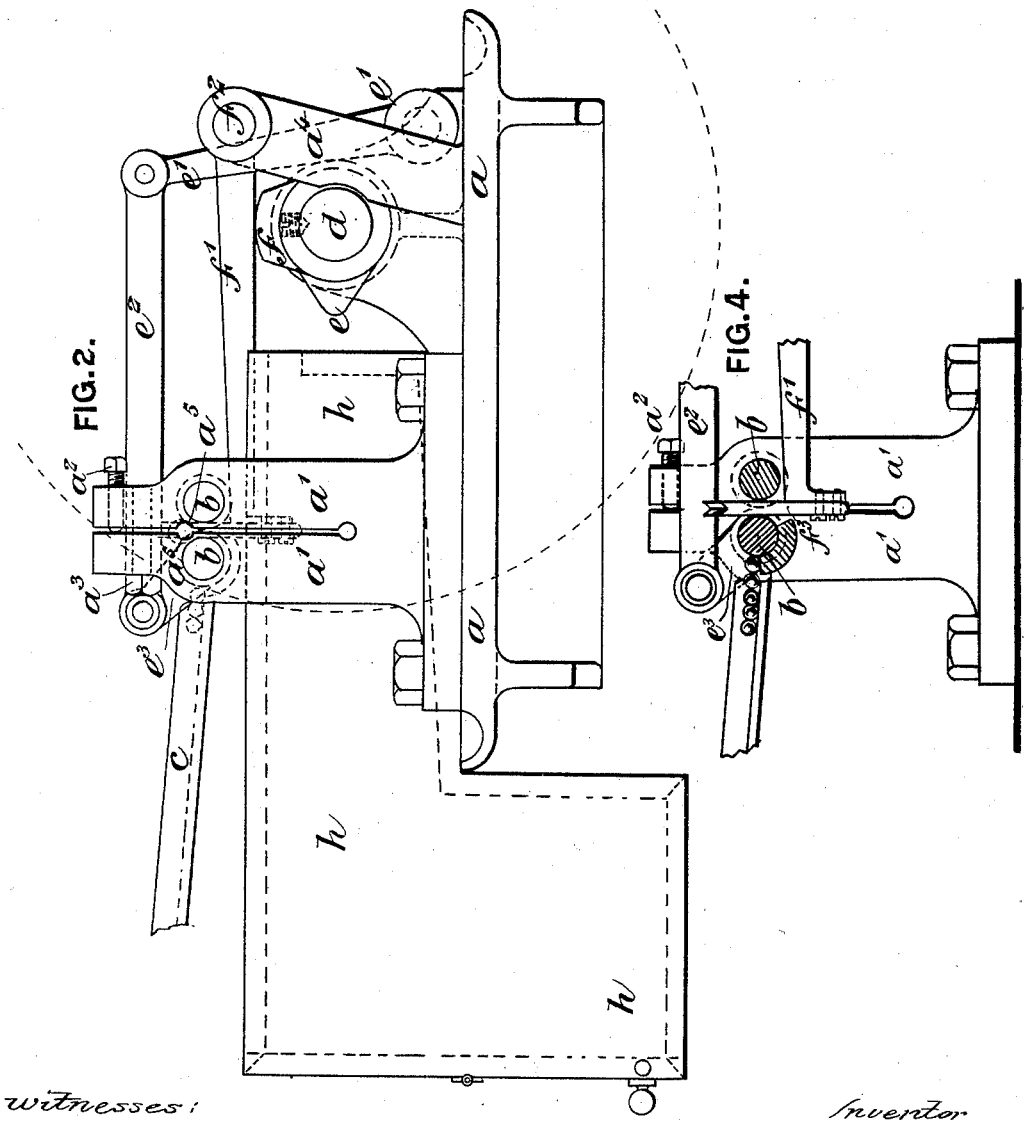

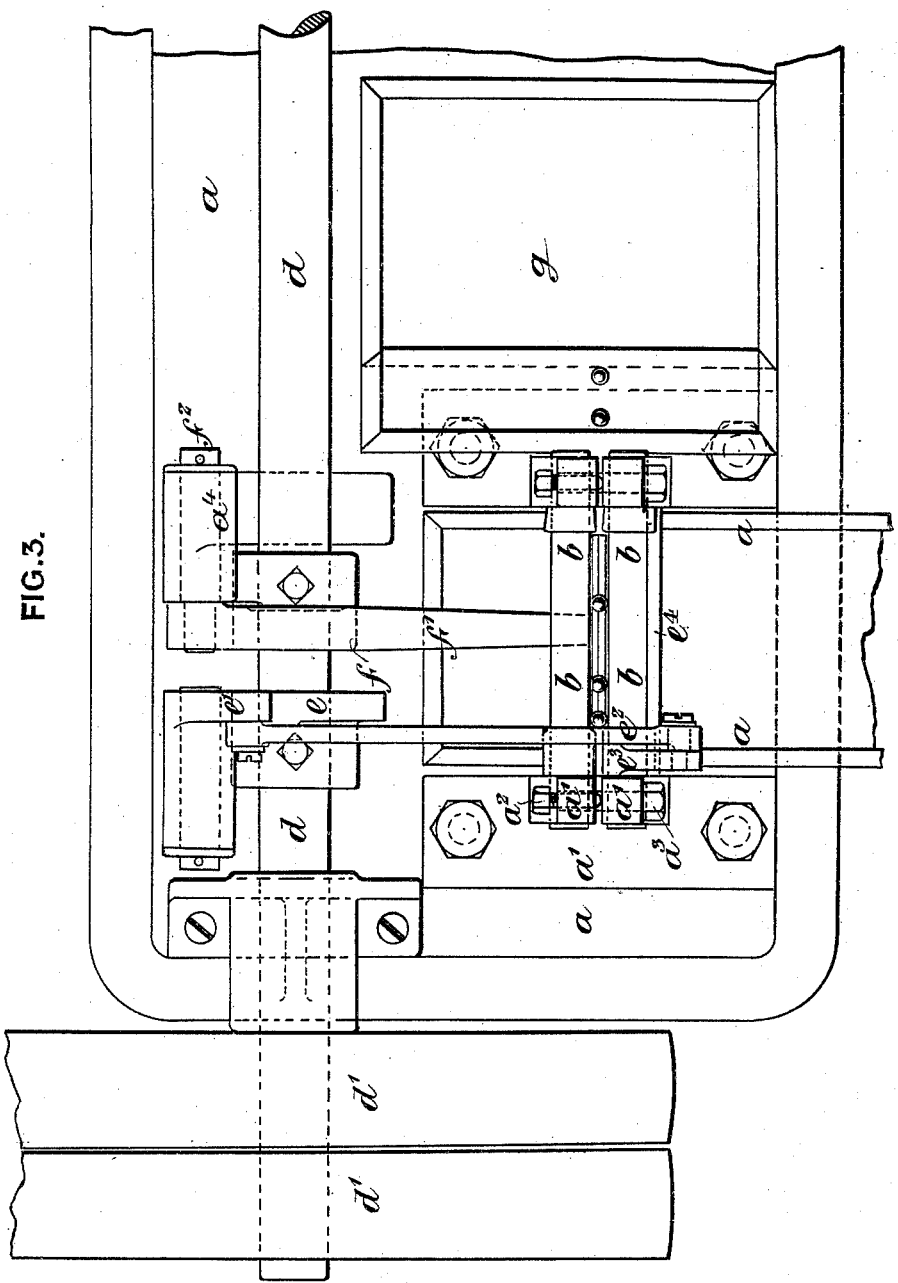

UNITED STATES PATENT OFFICE.

WILLIAM HILLMAN, OF COVENTRY, ENGLAND, ASSIGNOR TO THE AUTO MACHINERY COMPANY, LIMITED, OF SAME PLACE.

MEANS OR APPARATUS FOR GAGING AND SORTING SPHERICAL ROLLERS OR BALLS.

SPECIFICATION forming part of Letters Patent No. 482,636, dated September 13, 1892.

Application filed February 10, 1892. Serial No. 420,970. (No model.)

*To all whom it may concern:*

Be it known that I, WILLIAM HILLMAN, a subject of the Queen of Great Britain, residing at Coventry, in the county of Warwick, England, have invented certain new and useful Improvements in Means or Apparatus for Gaging and Sorting Spherical Rollers or Balls, of which the following is a specification.

The object of this invention is to provide machinery or apparatus whereby balls—such as are used in the bearings of cycles and other machines—can be automatically gaged and sorted in regard to their size and the same more economically effected than by the present known methods. The machine is provided with a pair of adjustable gaging-bars, preferably round, mounted in suitable adjustable brackets and being parallel with each other in a horizontal position. The balls to be gaged are placed in a tray or hopper in front of the said gaging-bars, the said tray or hopper being so tilted that the balls always roll down to the gaging-bars. The machine is provided with a rotating cam-shaft, which has two cams fixed thereon. One of the said cams serves, by means of suitable mechanism, to give motion to a feeder to lift a row of balls from the hopper and feed them to between the gaging-bars. The top of this feeder when in position to receive a row of balls is in line with or a little below the surface of the feeding tray or hopper, and in feeding said balls to between the gaging-bars moves in an arc around the front gaging-bar. The other cam operates a lever having an inclined grooved head shaped to move up and down freely between the gaging-bars, the said grooved head being the full length of that part of the said gaging-bars into which the balls are fed, and, being inclined from the horizontal, ejects from the gaging-bars all the balls which, in consequence of being over the required size, have been retained between such bars. The smaller balls fall between the gaging-bars into a receptacle beneath the latter. The larger ones run into a receptacle placed, preferably, at the side.

In order that my said invention may be more clearly understood and readily carried into effect, I will proceed, aided by the accompanying drawings, more fully to describe the same.

In the drawings, Figure 1 is a front view, Fig. 2 an end view, Fig. 3 a plan, and Fig. 4 a cross-section, of parts representing my improved apparatus for gaging and sorting spherical rollers or balls. In Fig. 1 the feeding tray or hopper is omitted for the sake of clearness.

$a$ is the bed of the machine.

$b\ b$ are two adjustable gaging-bars, which are preferably round in cross-section and are mounted parallel with each other and in a horizontal plane in adjustable brackets $a'\ a'$, fixed to the bed $a$ of the machine. These brackets $a'$ are divided vertically from a short distance above their feet to the top thereof, thus forming two arms separated from each other by a narrow space. A gaging-bar $b$ is mounted in each arm, and a push-screw $a^2$ is screwed through the upper end of one of such arms and bears against the other arm, while a binding-screw $a^3$ is passed freely through this latter arm and screwed into the former arm, by which means the gaging-bars $b\ b$ can be minutely and accurately spaced.

The balls to be gaged are placed in a tray or hopper $c$ in front of the gaging-bars $b\ b$. This tray or hopper is preferably fitted with a glass bottom and is set at such an angle as will permit of the balls rolling freely down to the gaging-bars without hanging or crowding.

The machine is provided with a rotating cam-shaft $d$, which has fast and loose pulleys $d'\ d'$ and two cams $e\ f$ fixed thereon. The cam $e$ acts upon a lever $e'$, which, by a link $e^2$ and lever $e^3$, gives motion to a feeder $e^4$ to lift a row of balls from the tray or hopper $c$ and feed them to between the gaging bars $b\ b$. The top of this feeder when in position to receive a row of balls is in line with or a little below the surface of the feeding tray or hopper. The said feeder $e^4$ consists of a segment of a cylinder concentric with one of the gaging-bars $b$ and it is connected with bosses $e^5\ e^6$, mounted on said gaging-bar, with capability of freely turning thereon. The boss $e^5$ forms the boss of the lever $e^3$. In feeding the balls to between the gaging-bars the feeder $e^4$ moves in an arc around the front gaging-bar, so as to carry a row of balls over the top of said front gaging-bar and drop them into the space between the gaging-bars. The cam $f$ acts upon a ball-ejecting lever $f'$, mounted on a stud or axis $f^2$ at the upper end of a bracket $a^4$. The front end of this lever carries an ejecting-head $f^3$, the upper end of which is inclined and grooved. This ejecting-head $f^3$ moves freely up and down between the gaging-bars $b\ b$, and it is of the full length of that part of the said gaging-bars into which the balls are fed. Thus in the rising of the ejecting-head $f^3$ between the gaging-bars all those balls which, in consequence of being over the required size, have been retained between the gaging-bars are lifted by the inclined grooved top of the ejecting-head $f^3$, and by running down the said inclined groove are caused to fall into the box $g$ at the side of the machine. The balls which pass through the space between the gaging-bars are received into a box $h$, extending to the front of the machine. The bosses at the right ends of the gaging-bars are inclined, as shown in Figs. 1 and 3, to avoid any obstruction to the passage of the balls past the same, and the right bracket $a'$ is formed with a tapered inclined hole $a^5$ (see Figs. 1 and 2) to permit of the free passage of the ejected balls through the same.

In practice a number of sets of the apparatus above described may be mounted on one table and have one common cam-shaft and set of driving-pulleys, and for very minute or exact gaging or sorting the spherical rollers or balls, after having been gaged or sorted in one machine, are passed through one or more additional machines in which the gaging-bars are set successively slightly closer together.

Having fully described my invention, what I desire to claim and secure by Letters Patent is—

1. In means or apparatus for gaging and sorting spherical rollers or balls, the combination of adjustable parallel gaging-bars, a slightly-inclined feeding-tray in front of the gaging-bars, a feeder between the lower edge of the said tray and the front gaging-bar and moving in an arc around the latter, an inclined grooved ejector working up and down between the gaging-bars, cams and levers for operating the feeder and ejector, and boxes for receiving the balls as sorted, substantially as herein shown and described.

2. In a gaging and sorting apparatus, the combination of the tray, the pair of adjustable gage-bars, the feeder working at the end of the tray and delivering the balls directly on the gage-bars, and the intermittently-reciprocating ejector working between the gage-bars, said parts having suitable driving mechanism, substantially as described.

3. In a gaging and sorting apparatus, the combination of the inclined tray, the pair of parallel gage-bars located parallel with the mouth of the tray, and the oscillating feeder journaled on one of the gage-bars and working between the tray and gage-bars, whereby a row of balls are simultaneously delivered from the tray to the gage-bars, for the purpose explained.

4. In means or apparatus for gaging and sorting spherical rollers or balls, a pair of adjustable gaging-bars between which balls below a given size will fall into a receptacle below, means for feeding balls to such gaging-bars, and an inclined grooved ejector working up and down between the gaging-bars and ejecting into a side receptacle those balls which were too large to pass through the space between the gaging-bars, substantially as herein shown and described.

5. In a gaging and sorting apparatus, the combination of the tray, the parallel gage-bars located parallel with the tray, and the segmental feeder between the tray and gage-bars journaled on and oscillating about the adjacent gage-bar, in the manner substantially as described, and for the purpose set forth.

6. In a gaging and sorting apparatus, the gage-bars, the pair of vertical arms in which the ends of said gage-bars are mounted, and the micro-adjustment for the bars, consisting of the set-screws threaded in one arm and bearing on the other of each pair of arms for regulating the distance between them, substantially as explained.

7. In a gaging and sorting apparatus, the combination of the gage-bars and the pair of vertical brackets for supporting said gage-bars, each of said brackets being split to form arms and provided with the push-screws, and binding-screws for accurately spacing the distance between the arms, all substantially as and for the purpose set forth.

8. In a gaging and sorting apparatus, the combination of the pair of parallel gage-bars and the vertically-reciprocating ejector having a grooved upper side working between said bars, substantially as and for the purpose set forth.

9. In a gaging and sorting apparatus, the combination, with the parallel gage-bars, of the vertically-reciprocating ejector working between said gage-bars and having grooved and inclined upper side, substantially as and for the purpose set forth.

10. In a machine for gaging and sorting, the combination of a suitable base, a pair of vertical brackets supporting gage-bars, an inclined tray terminating on a line adjacent to the gage-bars, the feeding-segment journaled on one of the gage-bars and having a controlling-lever, an ejector having an inclined grooved upper side reciprocating between the gage-bars, a suitably-fulcrumed lever upon which the ejector is supported, a suitably-fulcrumed controlling-lever connected by a link to the feed-lever, a power-shaft having cams for engaging the ejector-lever and the feed-controlling lever, and suitable receptacles beneath the gage-bars and the end of the ejector, all substantially as and for the purposes set forth.

WILLIAM HILLMAN.

Witnesses:
W. H. HERBERT,
GRAHAM I. FRANCIS.